United States Patent [19]

Lermann et al.

[11] 4,067,028
[45] Jan. 3, 1978

[54] PROPER SYNCHRONIZATION OF THE FIRING OF ELECTRONIC FLASH UNITS

[75] Inventors: Peter Lermann, Narring; Eduard Wagensonner, Aschheim, both of Germany

[73] Assignee: AGFA-Gevaert, AG, Leverkusen, Germany

[21] Appl. No.: 666,658

[22] Filed: Mar. 15, 1976

[30] Foreign Application Priority Data

Mar. 27, 1975 Germany .............................. 2513812

[51] Int. Cl.² ............................................. G03B 15/03
[52] U.S. Cl. .................................... 354/141; 354/145; 315/241 P
[58] Field of Search .................... 315/241 P; 354/137, 354/139, 141, 145, 149; 307/252 M, 293

[56] References Cited

U.S. PATENT DOCUMENTS

| 3,417,297 | 10/1966 | Wallentowitz | 307/293 |
| 3,712,197 | 1/1973 | Wagner | 354/145 X |
| 3,896,459 | 7/1975 | Ogawa et al. | 354/145 |
| 3,969,737 | 7/1976 | Kendrick | 354/141 |

Primary Examiner—L. T. Hix
Assistant Examiner—William B. Perkey
Attorney, Agent, or Firm—Michael J. Striker

[57] ABSTRACT

A photographic camera is provided with means for detachably mounting either a flashbulb flash unit or an electronic flash unit. The camera includes a piezoelectric transducer mechanically activatable for generating voltage impulses. When the flashbulb flash unit is mounted on the camera, the voltage impulses are directly applied across the terminals of the flashbulb. There elapses a certain time interval between the start of flashbulb firing and the development of maximum flashbulb output illumination. This time interval is taken into account in the design of the shutter-activating mechanism. When, instead of the flashbulb flash unit, the electronic flash unit is mounted on the camera, the voltage impulses generated for flashbulb firing are utilized to initiate operation of the electronic flash unit. Because the flash tube of the unit develops maximum output illumination more quickly than does a flashbulb, a time-delay circuit is utilized to effect compensation.

7 Claims, 6 Drawing Figures

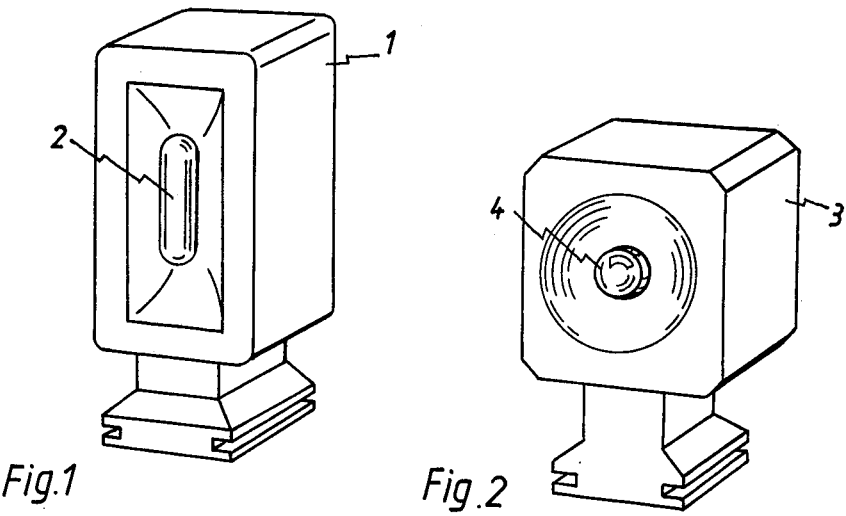
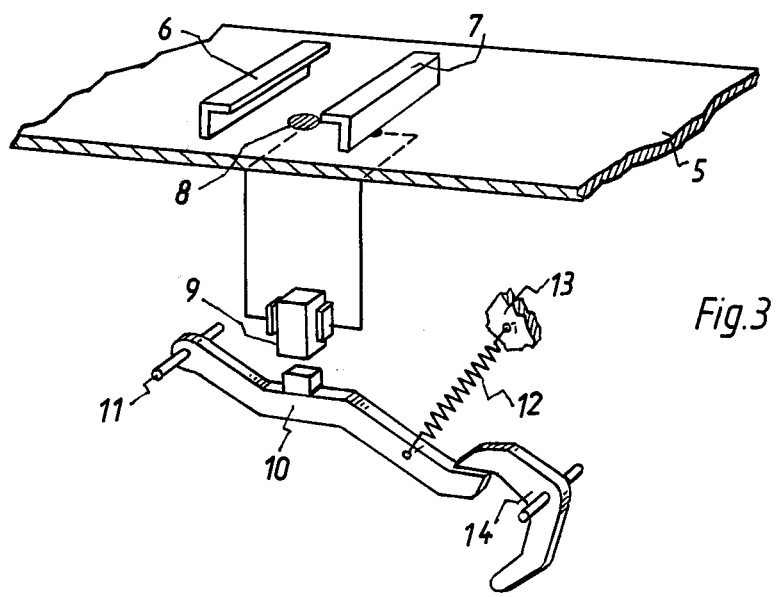
Fig.1  Fig.2  Fig.3

PROPER SYNCHRONIZATION OF THE FIRING OF ELECTRONIC FLASH UNITS

BACKGROUND OF THE INVENTION

The invention relates to an arrangement for effecting the properly synchronized firing of an electronic flash unit using the voltage impulses generated by a mechanically activated electromechanical transducer, particularly a piezoelectric transducer, otherwise employed for firing flashbulbs by applying such voltage impulses directly across the terminals of flashbulbs of flashbulb flash units.

The time elapsing between the application of a firing voltage across the terminals of a flashbulb and the development of maximum flashbulb output illumination, on the one hand, is considerably longer than the time elapsing between the firing of an electronic flash tube and the development of maximum flash tube output illumination on the other hand.

If, for example, a camera is provided with means for generating a firing voltage impulse to be directly applied across the terminals of flashbulbs of flashbulb flash units, the use of such voltage impulses to fire the flash tubes of electronic flash units may cause difficulties, because of the loss of proper synchronism with the operation of the shutter-opening mechanism.

SUMMARY OF THE INVENTION

It is a general object of the invention to provide an arrangement making it possible to utilize for the firing of the flash tubes of electronic flash units piezoelectric firing devices otherwise employed for the firing of the flashbulbs of flashbulb flash units, without loss of proper synchronism between the output illumination versus time curve of the flash unit, on the one hand, and the operation of the shutter-opening mechanism, on the other hand.

Because in general a flashbulb requires a certain time before its maximum output illumination is reached, the invention provides for the introduction of a time delay between the generation of the voltage impulse by the piezoelectric or other transducer device, on the one hand, and the actual firing of the flash tube of the electronic flash unit, on the other hand. In this way, it becomes possible to synchronize the development of maximum flash tube output illumination with maximum opening of the shutter during the shutter-opening operation, or to otherwise properly relate the firing of the flash tube to the shutter-opening operation, to assure similar exposure conditions for flash units of both types.

Specifically, the invention provides for the combination of firing means activatable for firing the flash tube and time-delay means connected to the firing means and operative upon receipt of a voltage impulse from the electromechanical transducer for activating the firing means after the elapse of a predetermined time interval.

According to one inventive concept, the firing means includes a firing switch activatable for effecting firing of the flash tube, and the time-delay means includes a time-delay stage connected to the firing switch and operative when activated for activating the firing switch after the elapse of the predetermined time interval, voltage supply means for furnishing a supply voltage, and a time-delay-stage-activating switch activated by the voltage impulses and operative when activated for activating the time-delay stage by effecting the application of the supply voltage thereto, the voltage supply means including means for stablizing the supply voltage so that is will be the same each time it is applied to the time-delay stage.

The stabilization of the supply voltage applied to the time-delay stage ensures that the time delay introduced into the flash tube firing operation will always have the same predetermined duration independent of fluctuations in the voltage supply for the electronic flash unit.

Another advantage of the inventive expedient is that the need for mechanical switches, such as synchronizing contacts, in the photographic camera to be provided with the electronic flash unit is eliminated.

Advantageously, the firing means and the time-delay means are both in the electronic flash unit, which is preferably detachably mounted on the camera, whereas the piezoelectric transducer is contained within the camera. In this way, the same electromechanical transducer can be used for firing the flashbulbs of a flashbulb flash unit and for initiating the operation of an electronic flash unit, so that the camera can be used with either kind of flash unit.

A related advantage is that the camera can be used with either kind of flash unit without requiring the provision of adjusting means, especially of the kind which must be manually set by the user of the camera, to take into account the difference in the operating characteristics of the two kinds of flash units.

According to a further concept of the invention, the time-delay-stage-activating switch is a thyristor connected in the current path of the time-delay stage, with the supply voltage applied to the time-delay stage being stabilized by means of a zener diode or by means of a glow lamp or other ionized gas lamp, If a glow lamp is used to stabilize the supply voltage for the time-delay stage, then it is particularly advantageous to utilize a glow lamp anyway being used for indicating purposes. The stabilization of the supply voltage applied to the time-delay stage ensures that such voltage will be independent of the flash unit voltage which, as is well known, decreases from a high magnitude prior to the firing of the flash tube to a much lower magnitude thereafter.

According to another concept of the invention, the means for stabilizing the supply voltage applied to the time-delay stage includes a storage capacitor which charges up, prior to the initiation of a flash operation, through a high-ohmic resistor. The resistance of this resistor is chosen so high as to assure that, after the firing of the flash tube and the discharge of the storage capacitor through the time-delay stage, the current which the high-ohmic resistor could route towards the thyristor would be below the holding current value for the thyristor. Instead of using such a current-limiting charging resistor, use can be made of a commutating capacitor connected between corresponding main electrodes (anode or cathode) of the thyristor used to activate the time-delay stage, on the one hand, and the thyristor used to discharge the firing capacitor, on the other hand. When the discharge thyristor for the firing capacitor becomes conductive, it causes the commutating capacitor to apply a reverse-bias voltage to the time-delay-stage-activating thyristor, rendering the latter non-conductive.

According to a further concept of the invention, there is connected in series with the discharge thyristor for the firing capacitor a high-ohmic resistor whose resistance is so high that, after discharge of the firing capacitor, the current which the high-ohmic resistor would be capable of carrying to the firing thyristor would be less than the holding current value for the firing thyristor.

According to a still further concept of the invention, means is provided for limiting the time interval during which the stabilized supply voltage remains applied to the time-delay stage in response to activation of the time-delay-stage-activating switch. This limited time interval is preselected to be longer than the compensation time delay. The limitation of the time interval during which the stabilized supply voltage remains applied to the time-delay stage creates a gating effect which advantageously serves to limit the energy consumption involved in the working of the main time-delay stage to a value as little as possible above the minimum actually required.

According to another concept of the invention, the combined stabilization of the supply voltage and the limiting of the duration of its application to the main time-delay stage can be achieved in either of at least two ways. In the first way, a fixed-voltage device such as a zener diode or ionized gas lamp is used to charge a storage capacitor to a reliably predetermined starting voltage. Then, the time-delay-stage-activating switch causes the storage capacitor to become connected across the time-delay stage. In the alternative second way, the capacitance of the storage capacitor and the resistance of a time-delay resistor connected in the discharge path thereof are utilized to determine the length of time required for the storage capacitor to discharge. Also connected to the storage capacitor discharge path is a zener diode or other voltage-stabilizing element. When the time-delay-stage-activating switch is rendered conductive, it causes the voltage of the zener diode to be applied across the main time-delay stage. The RC time constant of the storage capacitor and its discharge resistor together determine the length of time during which the zener diode receives operating current.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 depicts an electronic flash unit;
FIG. 2 depicts a flashbulb flash unit;
FIG. 3 depicts the relevant part of a photographic camera on which can be detachably mounted either the electronic flash unit of FIG. 1 or the flashbulb flash unit of FIG. 2.

DESCRIPTION OF THE PREFERRED EMBODIMENTS

Figure 4:
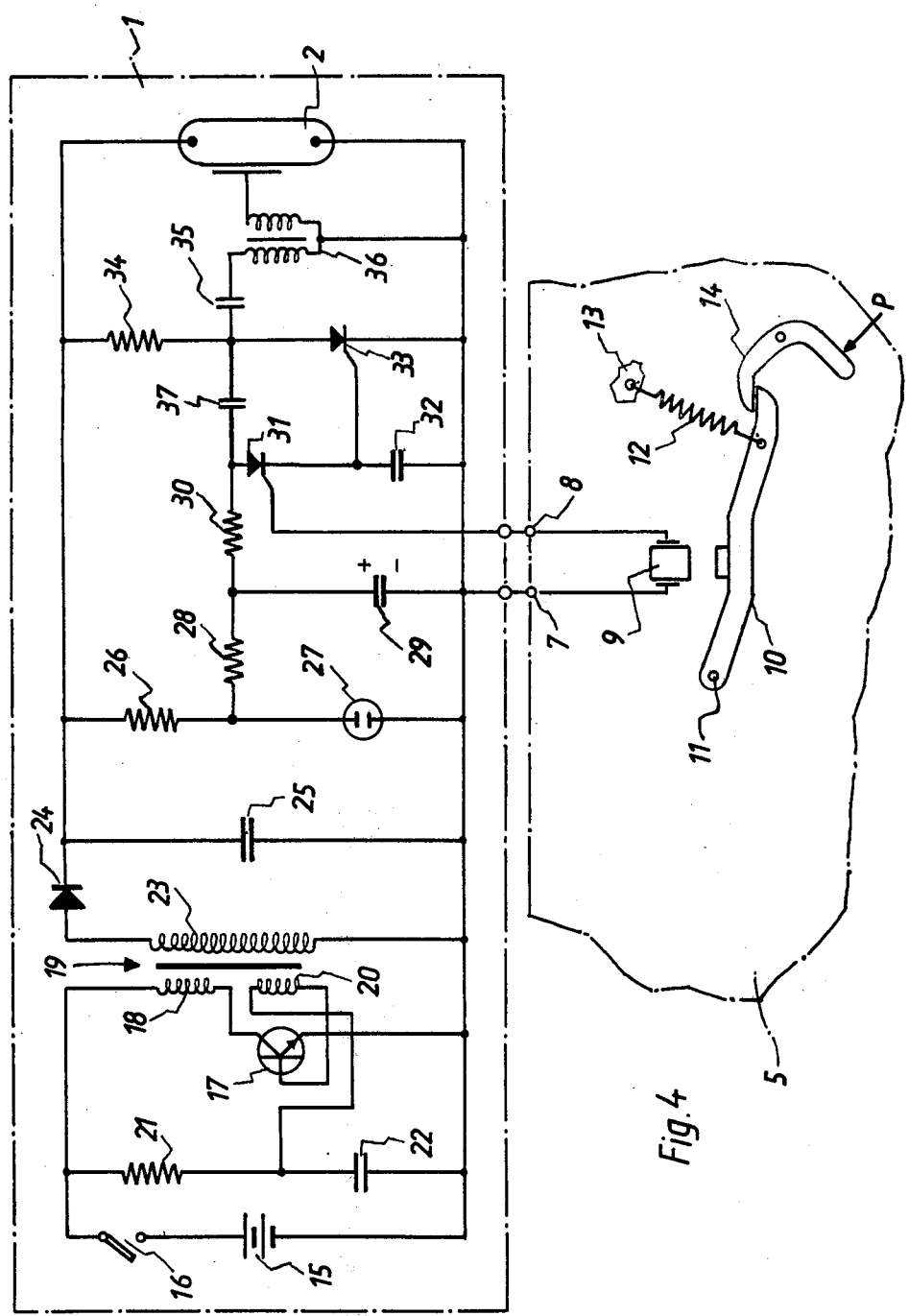
FIG. 4 depicts a circuit for effecting the properly synchronized firing of the flash tube of an electronic flash unit.

FIG. 1 depicts an electronic flash unit 1 provided with an electronic flash tube 2, whereas FIG. 2 depicts a flashbulb flash unit 3 provided with a flashbulb 4. The bases of flash units 1 and 3 are identically configurated, so that either one may be slid into position beneath the holding brackets 6, 7 on the housing of a photographic camera 5. Located intermediate the holding brackets 6, 7 is a central contact 8. An electric lead connects central contact 8 to one terminal of a piezoelectric crystal 9 the other terminal of which is electrically connected to an electrically conductive one of the holding brackets 6, 7.

Piezoelectric crystal 9 can be used to generate a high-magnitude voltage impulse by striking upon it with an impact member 10. Impact member 10 is mounted for pivotal movement about a pivot pin 11 and is biased by a tension spring 12 which is connected with a portion 13 of the housing of the camera 5. The impact member 10 is ordinarily held in cocked position by means of a release detent 14.

FIG. 4 depicts the circuitry of the electronic flash unit 1 of FIG. 1 mounted in place on the camera 5 by means of the holding brackets 6, 7. Components corresponding to those shown in FIGS. 1 and 2 are identified by the same reference numerals.

Electronic flash unit 1 includes, besides the electronic flash tube 2, a D.C. voltage source 15. A power-connect switch 16 is used to connect voltage source 15 to the remainder of the illustrated circuit. The flash unit 1 includes a D.C. to D.C. voltage converter operative for converting the low-magnitude D.C. output voltage of source 15 into a high-magnitude D.C. voltage which can be used for firing the flash lamp 2. The D.C. to D.C. converter includes a transistor 17 in the collector circuit of which is connected a first primary winding 18 of a transformer 19. Connected in the base circuit of transistor 17 is a second primary winding 20 of transformer 19. Winding 20 connects the base of transistor 17 to an RC-timing stage 21, 22. The secondary winding 23 of transformer 17 is connected via a charging diode 24 with the main capacitor 25 of the D.C. to D.C. converter. Main capacitor 25 serves both to smooth the output voltage of the D.C. to D.C. converter and also to store a very considerable amount of energy, so that the capacitor will act in effect as a high-voltage energy source for the remainder of the flash circuitry.

Connected in series across main capacitor 25 is a high-ohmic resistance 26 and a glow lamp 27 used both for indicating and voltage-stabilizing purposes. Connected in series across glow lamp 27 is a high-ohmic resistor 28 and a storage capacitor 29. Connected in series across storage capacitor 29 is a time-delay resistor 30, the anode-cathode path of a thyristor (or SCR) 31, and a time-delay capacitor 32. The control electrode (gate) of thyristor 31 is connected to central contact 8, which in turn is connected to one terminal of piezoelectric crystal 9, as described before.

Resistors 26 and 28 have resistance values so selected that, after the discharge of the storage capacitor 29 through resistor 26 and thyristor 31, the current flowing through the anode-cathode path of thyristor 31 will be below the holding current value, so that thyristor 31 can become non-conductive.

The upper electrode of time-delay capacitor 32 is connected to the control electrode of a firing thyristor 33. The anode-cathode path of thyristor 33 is connected in series with a high-ohmic resistor 34 across the main capacitor 25. The resistance of resistor 34 is so high that, after the discharge of the firing capacitor 35, the current flowing through the anode-cathode path of thyristor 33 will be lower than the holding current value for the thyristor.

Numeral 36 denotes a firing transformer, the secondary winding of which is connected to the control electrode of the electronic flash lamp 2. Numeral 37 denotes a commutating capacitor. When thyristor 31 becomes conductive (in the manner described in detail below), a commutating voltage builds up across commutating capacitor 37. When thereafter thyristor 33 becomes conductive, this commutating voltage is utilized to render the thyristor 31 non-conductive. Commutating capacitor 37 assures the application of a reverse bias to the anode of thyristor 31, whereas high-ohmic resistors 26, 28 ensure that the anode-cathode current of thyristor 31 will be lower than the holding value.

The operation of the arrangement shown in FIG. 4 is as follows:

Flash unit 1 is slid into position on the housing of photographic camera 5. Power-connect switch 16 is closed manually before or after such attachment, or instead can be closed automatically in the course of attaching the flash unit to the camera by the provision of suitable automatic switch-closing means. Closing of power-connect switch 16 sets the D.C. to D.C. converter into operation, and causes main capacitor 25 to become charged. When main capacitor 25 becomes charged to a predetermined extent, glow lamp 27 will become illuminated, indicating that the flash unit is ready for operation.

Storage capacitor 29 will charge up, via resistor 28, to the voltage across glow lamp 27. Because the voltage across glow lamp 27 is always the same, storage capacitor 29 will always charge up to the same voltage, regardless of the voltage across D.C. voltage source 15, and despite fluctuations in the voltage across main capacitor 25. This is important because, as explained below, storage capacitor 29 participates in a timing function which, as a result, will be reliably the same from one flash operation to the next.

Another capacitor which charges up in preparation for the flash is the firing capacitor 35. Firing capacitor 35 charges up via high-ohmic resistor 34 and the primary winding of firing transformer 36.

If now release detent 14 is pivoted under the action of release force P, spring 12 will forcefully pull impact member 10 upwards, causing it to strike the piezoelectric crystal 9. The high-magnitude voltage impulse generated across piezoelectric crystal 9 is applied across the gate-cathode path of thyristor 31, causing thyristor 31 to become conductive.

When thyristor 31 becomes conductive, storage capacitor 29 can begin to discharge through resistor 30, the anode-cathode path of thyristor 31, and the time-delay capacitor 32. As indicated before, the starting voltage across capacitor 29 will be the same from one flash operation to the next, because this starting voltage is determined by the ionization voltage of glow lamp 27. Accordingly, the amount of energy stored in capacitor 29 at the start of the flash operation and dissipatable through the discharge path 30, 31, 32 is limited and the same from one flash operation to the next.

At the start of the discharge of storage capacitor 29, the voltage across time-delay capacitor 32 is substantially zero. The rate at which voltage can build up across capacitor 32 in response to the discharge of storage capacitor 29 is determined by the capacitances of capacitors 29, 32 and by the resistance of resistor 30.

When the voltage across time-delay capacitor 32 has built up to the gate-cathode forward-bias voltage of thyristor 33, the latter becomes conductive.

When thyristor 33 becomes conductive, charged firing capacitor 35 discharges through the discharge path formed by the primary winding of firing transformer 36 and the anode-cathode path of thyristor 33. The sudden flow of discharge current through the primary winding of firing transformer 36 results in the generation across the transformer secondary of a high-magnitude voltage impulse which fires electronic flash lamp 2. When flash lamp 2 fires, the voltage between its main electrodes decreases in consequence of the decrease of its internal impedance.

At least until the discharge of firing capacitor 35, storage capacitor 29 serves to ensure that the anode-cathode current of thyristor 31 will not fall below the holdng value. However, when storage capacitor 29 becomes completely discharged, the only current flowing through the anode-cathode path of thyristor 31 will be that flowing through resistors 26, 28 and 30. Because of the high resistance values of resistors 26 and 28, this current will be below the holding current value for the thyristor. Additionally when thyristor 33 becomes conductive, the aforedescribed commutation voltage across commutating capacitor 37 will reverse-bias the anode-cathode path of thyristor 31. As a result of these two factors, thyristor 31 will become non-conductive The tme delay elapsing between the activation of release detent 14 and the actual firing of flash lamp 2 can be so selected that the firing of the lamp occurs just when the camera shutter has reached its maximum opening or, equivalently, at a moment corresponding in an appropriate manner to the moment when a flashbulb would reach its maximum light intensity, if the flashbulb flash unit instead of the electronic flash unit had been used.

When the electronic flash unit 1 is removed and the flashbulb flash unit 3 put in its place, the voltage generated across contacts 7, 8 will be directly applied across the terminals of the flashbulb 4.

Figure 5:
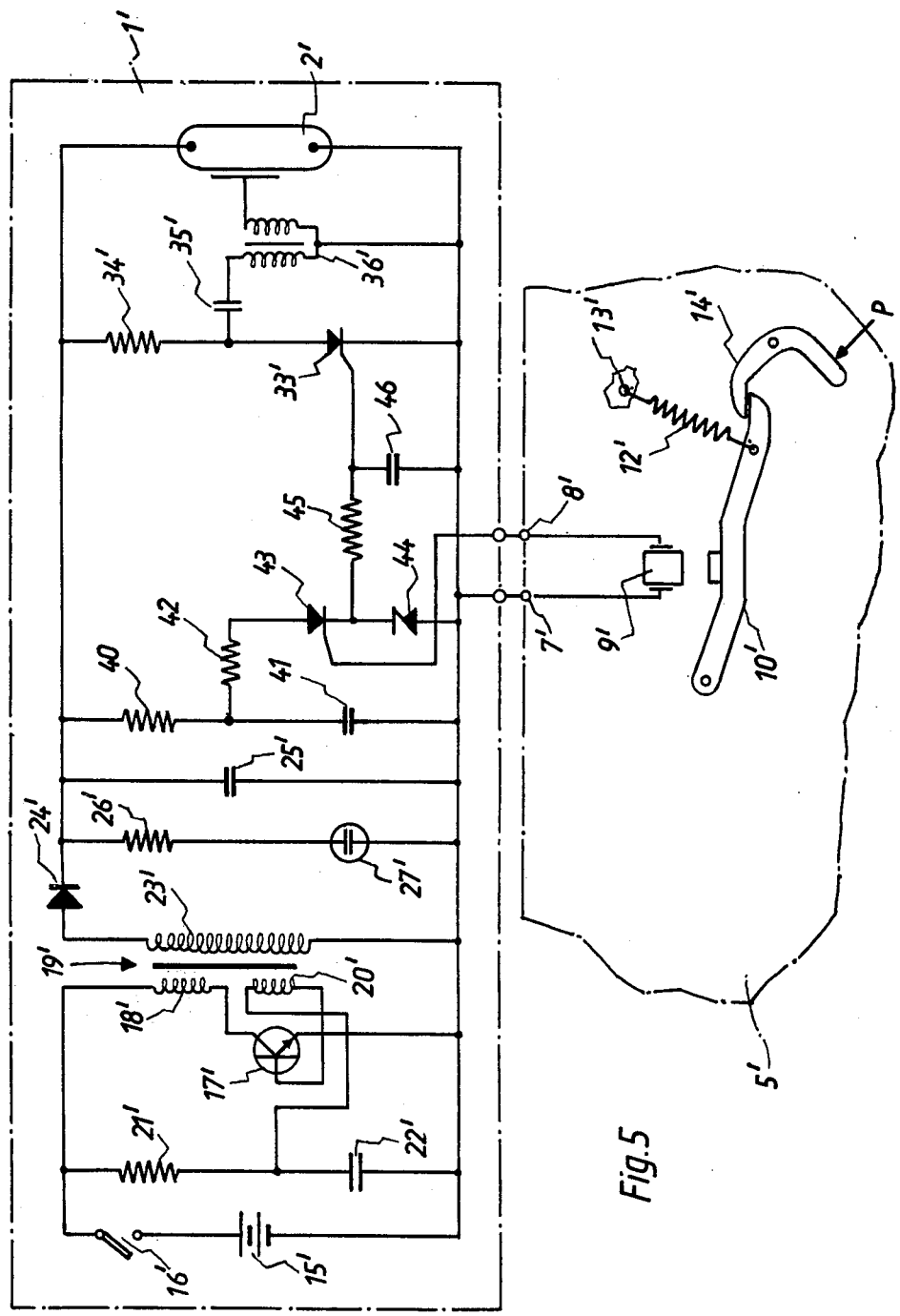
FIG. 5 depicts a second such circuit.

In the embodiment of FIG. 5, components corresponding to those of FIG. 4 are identified by the same reference numerals with the addition of a prime.

In FIG. 5, the glow lamp 27' is not used to predetermine the volage which builds up across storage capacitor 41 in preparation for a flash operation; consequently, in FIG. 5, glow lamp 27' and resistor 26 have been shifted over and connected directly across main capacitor 25', to serve only an indicating function.

In FIG. 5, there are connected in series across main capacitor 25' a high-ohmic resistor 40 and the aforementioned storage capacitor 41. Connected in series across storage capacitor 41 are a time-delay resistor 42, the anode-cathode path of a thyristor 43, and a zener diode 44. In FIG. 5, it is the zener diode 44 which assures that, when thyristor 43 is rendered conductive, the voltage applied across time-delay resistor 45 and time-delay capacitor 46 will always be the same, from one flash operation to the next. In FIG. 4, this was accomplished by using in combination the glow lamp 27 and the storage capacitor 29.

In FIG. 5, when the piezoelectric crystal 9' is struck, and thyristor 43 thereby rendered conductive, the storage capacitor 41 discharges through resistor 42, the anode-cathode path of conductive thyristor 43, and the zener diode 44. During the discharge of storage capacitor 41, the latter furnishes operating current to zener diode 44, and zener diode 44 in turn ensures that the voltage applied across time-delay components 45, 46 will be constant. The time required for storage capacitor 41 to discharge is longer than the desired time-delay between the striking of piezoelectric crystal 9' on the one hand, and the firing of flash lamp 2', on the other hand. When storage capacitor 41 becomes substantially completely discharged, the only current which could flow into the anode of thyristor 43 would be current flowing through resistor 40. However, the resistance value of resistor 40 is chosen so high that such current is lower than the holding current for thyristor 43. When the voltage across time-delay capacitor 46 has built up to the gate-cathode forward-bias value for thyristor 33', the latter becomes conductive and, as explained with reference to FIG. 4, flash lamp 2' fires. When the latter fires, it will draw a considerable amount of current, thereby reducing the amount of current which can flow through resistor 40 and in that way further contributing to the reliability with which thyristor 43 beomes nonconductive.

Figure 6:
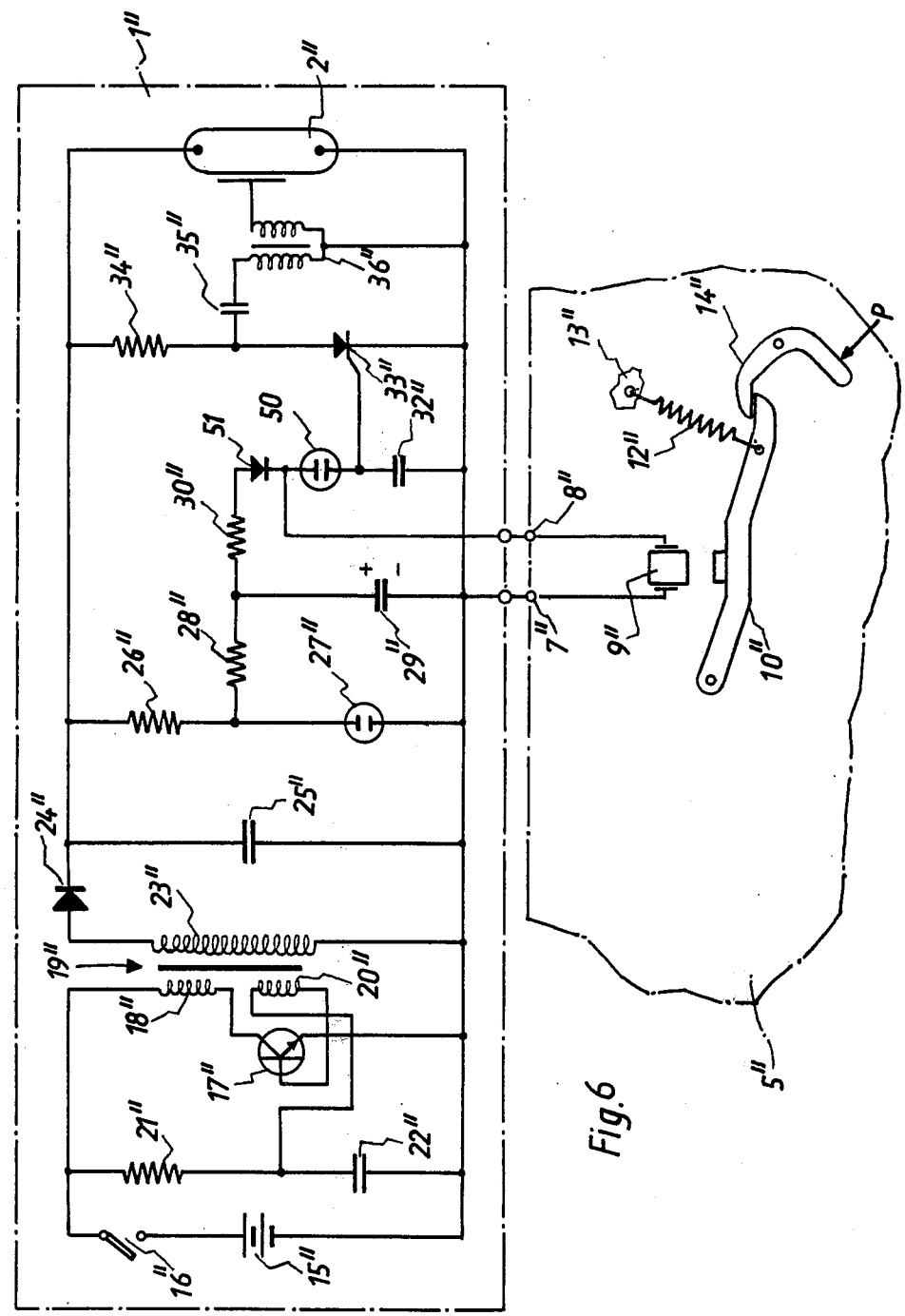
FIG. 6 depicts a third such circuit.

The embodiment of FIG. 6 is similar to that of FIG. 4. Again the indicator glow lamp 27" is used to predetermine the voltage build-up across storage capacitor 29", so that from one flash operation to the next the starting voltage applied across the time-delay stage components 30", 32" will always be the same. In FIG. 6, however, instead of a thyristor use is made of a further glow lamp 50 as a threshold switching device. A diode 51 serves to decouple the piezoelectric crystal 9" from the electrical components 28", 29" and 30".

It will be understood that each of the elements described above, or two or more together, may also find a useful application in other types of constructions and circuit configurations differing from the types described above.

While the invention has been illustrated and described as embodied in a set of components including a photographic camera, a flashbulb flash unit, and an electronic flash unit, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitute essential characteristics of the generic or specific aspects of this invention.

What is claimed as new and desired to be secured by Letters Patent is set forth in the appended claims:

1. An arrangement for firing an electronic flash tube using the voltage impulses generated by a mechanically activated electromechanical transducer, particularly a piezoelectric transducer, of the type employed for generating voltage impulses and applying the same directly across the terminals of flashbulbs, the arrangement being operative for compensating for the time interval elapsing between the application of such voltage impulses to flashbulbs and the reaching of maximum flashbulb output illumination, on the one hand, and the different time interval elapsing between the firing of a flash tube and the reaching of maximum flash tube output illumination on the other hand, the arrangement comprising, in combination, firing means for firing the flash tube including a firing thyristor, a firing capacitor and firing-voltage-generating means connected in circuit, the firing thyristor when conductive discharging the firing capacitor, and a first charging resistor connected to the thyristor and capacitor, the resistor being operative when the thyristor is nonconductive for charging the capacitor, the resistor being operative upon capacitor discharge for carrying thyristor current, the resistance of the resistor being so high that upon capacitor discharge the thyristor current carried by the resistor is below the thyristor holding current; time-delay means having an output connected to the firing-thyristor control electrode for rendering the firing thyristor conductive and having an input, and including an activating thyristor in the current path of the time-delay means, the activating thyristor having a control electrode connected to the electromechanical transducer and being rendered conductive by the transducer voltage impulse; and means for furnishing a stabilized supply voltage to the input of the time-delay means including a storage capacitor connected to the input of the time-delay means and operative for discharging through the current path of the time-delay means when the activating thyristor becomes conductive, a second charging resistor connected to the storage capacitor and the activating thyristor, the second charging resistor being operative for charging the storage capacitor when the activating thyristor is non-conductive, the second charging resistor being operative upon discharge of the storage capacitor for carrying activating-thyristor current, the resistance of the second charging resistor being so high that upon storage-capacitor discharge the activating-thyristor current carried by the second charging resistor is below the activating-thyristor holding current, and a voltage-stabilizing means connected to the storage capacitor and to the input of the time-delay means and operative for causing the voltage applied from the storage capacitor to the input of the time-delay means to be the same each time the activating thyristor is rendered conductive.

2. An arrangement as defined in claim 1, the arrangement being comprised of a photographic camera and an electronic flash unit detachably mounted on the camera, the flash unit containing the flash tube, the firing means and the time-delay means, and the camera containing the electromechanical transducer.

3. An arrangement as defined in claim 1, the voltage stabilizing means comprising an ionized gas indicator lamp operative for determining the magnitude of the voltage applied from the storage capacitor to the input of the time-delay means.

4. An arrangement as defined in claim 1, the voltage-stabilizing means comprising a zener diode operative for determining the magnitude of the voltage applied from the storage capacitor to the input of the time-delay means.

5. An arrangement as defined in claim 1, further including a commutating capacitor connected between correspondng electrodes of the firing thyristor and the activating thyristor and operative when the firing thyristor becomes conductive for reverse biasing the activating thyristor.

6. An arrangement as defined in claim 1, the means for furnishing the stabilized supply voltage to the input of the time-delay means comprising limiting means operative in response to the assumption of the conductive state by the activating thyristor for causing the stabilized supply voltage to be applied to the input of the time-delay means for a limited predetermined time interval greater than the time-delay interval of the time-delay means.

7. An arrangement as defined in claim 6, the voltage-stabilizing means comprising a zener diode connected to the input of the time-delay means for furnishing a stabilized voltage thereto, and a time-delay resistor connected between the storage capacitor and the input of the time-delay means for discharging the former into the latter.

* * * * *